United States Patent
Schlemmer et al.

(10) Patent No.: US 9,500,088 B2
(45) Date of Patent: Nov. 22, 2016

(54) BLADE RIM SEGMENT FOR A TURBOMACHINE AND METHOD FOR MANUFACTURE

(71) Applicant: MTU Aero Engines GmbH, Munich (DE)

(72) Inventors: Markus Schlemmer, Mainburg/Wambach (DE); Marcin Rozak, Jaroslaw (PL); Alexander Buck, Munich (DE)

(73) Assignee: MTU AERO ENGINES AG, Munich (DE)

( * ) Notice: Subject to any disclaimer, the term of this patent is extended or adjusted under 35 U.S.C. 154(b) by 561 days.

(21) Appl. No.: 13/739,798

(22) Filed: Jan. 11, 2013

(65) Prior Publication Data

US 2013/0189108 A1    Jul. 25, 2013

(30) Foreign Application Priority Data

Jan. 11, 2012  (EP) .................................. 12150838

(51) Int. Cl.
| | | |
|---|---|---|
| *F01D 5/22* | (2006.01) | |
| *F01D 5/14* | (2006.01) | |
| *F01D 5/18* | (2006.01) | |
| *F01D 5/28* | (2006.01) | |
| *F01D 9/04* | (2006.01) | |

(52) U.S. Cl.
CPC ................ *F01D 5/225* (2013.01); *F01D 5/147* (2013.01); *F01D 5/18* (2013.01); *F01D 5/28* (2013.01); *F01D 9/041* (2013.01); *F05D 2300/606* (2013.01); *Y02T 50/676* (2013.01); *Y10T 29/49336* (2015.01)

(58) Field of Classification Search
CPC .......... F01D 5/225; F01D 5/18; F01D 5/147; F01D 5/28; F01D 9/041; F05D 2300/606
See application file for complete search history.

(56) References Cited

U.S. PATENT DOCUMENTS

| | | | | |
|---|---|---|---|---|
| 3,403,889 A | * | 10/1968 | Ciokajlo | F01D 25/162 415/118 |
| 5,382,135 A | * | 1/1995 | Green | 416/97 R |
| 5,605,438 A | * | 2/1997 | Burdgick | F01D 25/145 415/182.1 |
| 8,596,970 B2 | * | 12/2013 | Speed et al. | 415/209.4 |
| 2010/0043929 A1 | * | 2/2010 | Hobbs et al. | 148/714 |
| 2012/0107123 A1 | * | 5/2012 | Schlemmer | F01D 5/225 416/191 |

FOREIGN PATENT DOCUMENTS

| | | |
|---|---|---|
| DE | 10331599 A1 | 2/2005 |
| EP | 1131176 A | 5/2000 |
| EP | 1262634 B1 | 11/2006 |
| FR | 2928962 A1 * | 9/2009 |
| PL | WO 2010149139 A2 * | 12/2010 ............. F01D 5/225 |

* cited by examiner

*Primary Examiner* — Richard Edgar
*Assistant Examiner* — Jesse Prager
(74) *Attorney, Agent, or Firm* — Howison & Arnott, L.L.P.

(57) ABSTRACT

The present invention relates to a blade rim segment for a turbomachine with at least one shroud band which extends along a segment of a circle and is connected in single-piece fashion with at least three blades, which extend radially from the shroud band and are configured to be hollow with at least one channel, wherein the blade rim segment is manufactured in a single piece by casting and directional solidification, and wherein at the outlet openings of the channels of the blades, the shroud band exhibits first reinforcement ribs that surround the opening and run axially, as well as at least one second reinforcement rib between at least the first reinforcement ribs, as well as a corresponding method for manufacturing a blade rim segment.

12 Claims, 2 Drawing Sheets

BLADE RIM SEGMENT FOR A TURBOMACHINE AND METHOD FOR MANUFACTURE

CROSS-REFERENCE TO RELATED APPLICATIONS

This application claims benefit of European Patent Application No. 12150838.6-1267, filed Jan. 11, 2012, entitled Schaufelkranzsegment für eine Strömungsmaschine and Verfahren zur Herstellung, the specification of which is incorporated herein in its entirety.

TECHNICAL FIELD

The present invention relates to a blade rim segment for a turbomachine with at least one turbine shroud band which extends along a circular segment and is connected in a single piece with at least 3 blades, which extend radially from the shroud band and are configured to be hollow with at least one channel, wherein the blade rim segment is configured as a single piece via casting and directional solidification. In addition, the present invention relates to a corresponding method for manufacturing such a blade rim segment.

BACKGROUND

For turbomachines such as gas turbines or aircraft engines, guide and turbine blades are used which, due to the conditions of use at high temperatures in corrosive and abrasive environments and the like, must meet the most stringent requirements. To be able to further advance the performance capabilities of such turbomachines or to extend the service life of such engines, it is required that such components be further developed in multiple respects and a suitable structure be found with a trimmed profile of properties, which will be suitable for the many differing requirements for such components.

For example, in EP 1 131 176 B1, a monocrystalline guide blade segment and a method for its manufacture are described, in which multiple guide blades are formed for a turbomachine in a single piece in a directionally solidified material. Through directional solidification of the material for forming of the blades, certain properties of the material can be employed in a certain crystal orientation, such as increased energy for activation of glide planes in a main loading direction, so that the strength of the component is increased. It is true that such a manufacturing process entails a problem in that, for example, structural limitations must be accepted, to make it possible to implement the directional solidification.

Correspondingly, with a blade rim segment, as has been shown in FR 2 928 962, blades have in fact been implemented which exhibit certain structural features such as a hollow configuration with corresponding ventilation channels, but which, as regards the implementation of an advantageous materials concept, such as directional solidification, are limited.

SUMMARY AND DESCRIPTION

Therefore it is the task of the present invention to make available a blade rim segment and a method to manufacture same, which makes possible a further improvement of the blade rim segment in regard to the properties profile and producibility.

These problems are addressed by a blade rim segment with the features disclosed and claimed herein and a method for manufacturing a blade rim segment with the features disclosed and claimed herein. Advantageous embodiments are the subject of the dependent claims.

The present invention is characterized in that a blade rim segment with at minimum one shroud band, with which at least 3 blades, preferably 4 blades or more, are connected in a single piece, wherein the blades exhibit at least one channel and thus are hollow. The corresponding blade rim segment is configured in a single piece through casting and directional solidification. Additionally, in the area of the at least one shroud band, at the outlet openings of the blade channels, the corresponding blade rim segment exhibits surrounding and axially running first reinforcement ribs as well as a second reinforcement rib running between the first reinforcement ribs. Owing to this measure it is possible to manufacture the hollow blades and the shroud band from one material which can be directionally solidified, so that along with the structural advantages of a blade rim segment with as many blades as possible and a hollow configuration of the blades, also the advantages of a directionally-solidified alloy may be utilized, since the dimensions in the blade rim segment may be optimized for a directional solidification and load distribution in an instance of utilization.

Preferably the second reinforcement ribs may be placed offset to a connection area of the blade and shroud band, so that they are not in the elongation of the blades.

The blade rim segment may be a blade rim segment for guide or turbine blades. In addition, the blade rim segment may exhibit both an inner and an outer shroud band, and thus two shroud bands.

It is advantageous for the blade rim segment to be formed with at least 4, preferably 5 or 6 blades, because then a blade rim may be formed from a few blade rim segments, which lowers assembly costs.

In the axial direction, thus in a direction parallel to the rotational axis of the turbomachine, the shroud band may in essence exhibit a U-like shape, wherein the axially running first and second reinforcement ribs are placed between the legs of the U-like shape that forms the front walls of the shroud band.

Preferably the reinforcement ribs may be configured so that they do not project over the front-side walls of the shroud band in the radial direction. It is true that the reinforcement ribs as such may exhibit differing stretched areas, i.e. along one of their dimensions, or differing from each other in width, height or longitudinal direction and/or extend into areas of the front-side walls of the shroud band.

A correspondingly configured blade rim segment may be produced by directional solidification, wherein for formation a suitable shape is made available, in which one or more seed crystals is placed, so that after the form is filled with the molten material for formation of the blade rim segment, with an appropriate cooling of the melt, it solidifies with a desired crystal orientation.

BRIEF DESCRIPTION OF THE DRAWINGS

In a purely schematic depiction, the appended drawings show.

DETAILED DESCRIPTION

Further advantages, characteristics and features of the present invention will be made clear in the detailed specification that follows of embodiment examples using the appended figures. However, the invention is not limited to these embodiment examples.

Figure 1:
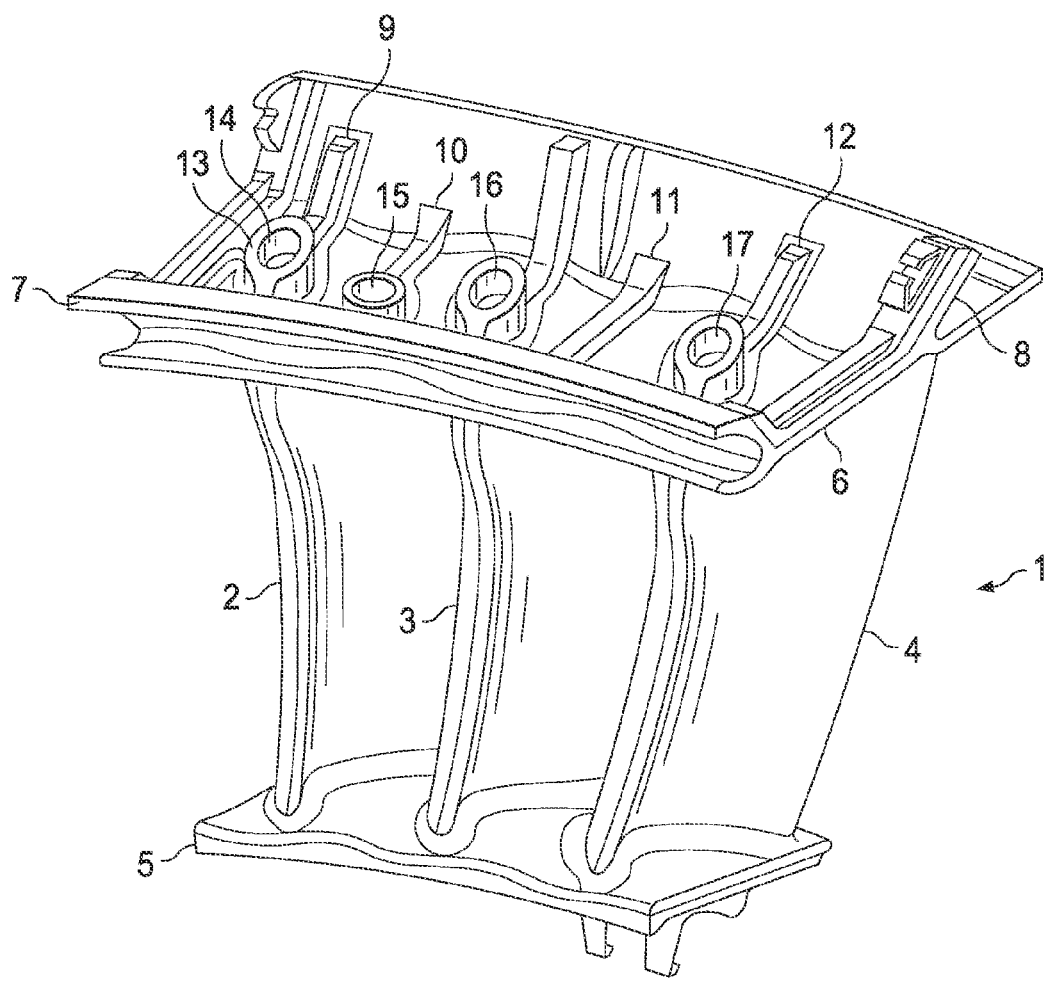
FIG. 1: a perspective depiction of an invention-specific blade rim segment.

FIG. 1 shows a blade rim segment 1 with three blades 2, 3, 4, which are situated on a lower shroud band 5 and an upper shroud band 6. The upper shroud band 6 exhibits in essence a U-like shape, with the front walls 7, 8 of shroud band 6 forming the legs of the U shape.

The blades 2, 3, 4 are configured hollow, and correspondingly, in the area of the upper shroud band 6, core removal openings 14, 15, 16, 17 are provided, by means of which the cores, which form the cavities 2, 3, 4 when the blade rim segment 1 is cast, may be removed from the cavities of blades 2, 3, 4 after the melt solidifies. Thus each blade exhibits at least one opening. However, it is also possible that multiple openings are provided for each blade or for each cavity of a blade.

After casting, the blade rim segment 1 is directionally solidified, i.e., a preferred orientation of the crystallites of the blade rim segment 1 is set. For this, into a casting form before filling of the blade rim segment 1, one or more seed crystals is added, which, together with a suitable cooling, provide that the melt solidifies so that the crystallites with their lattice are oriented in a certain direction. Thus the properties of the material that appear in a certain crystal orientation, can be used for the cast component, without having to manufacture a monocrystalline component.

In the area of openings 14, 15, 16, 17, the blade rim segment 1 shown exhibits reinforcement ribs (i.e., surrounding portions) 13, which surround each of the openings 14, 15, 16, 17; only reinforcement rib 13 around opening 14 is provided with a reference number.

Additionally, reinforcement ribs (i.e., axial portions) 9, 10, 12 are provided that extend in the axial direction, thus in a direction parallel to a rotational axis of the turbomachine in which the blade rim segment 1 is used.

Reinforcement ribs 9, 10, 12 extend from reinforcement ribs 13 around openings 14, 15, 16, 17 and run to the front walls 7, 8 and partially along them. In addition, between openings 16 and 17 an additional reinforcement rib 11 is provided, which extends from the front wall 7 to the front wall 8 and runs partially along front side wall 8. Reinforcement rib 11 (the second reinforcement rib) runs parallel to reinforcement ribs 9, 10, 12 (the first reinforcement ribs), but independent of the core removal openings 14, 15, 16, 17 and the reinforcement ribs 13 (first reinforcement ribs) surrounding them. In addition, the reinforcement rib is situated outside a connection area of blades 2, 3, 4 and shroud band 6.

The reinforcement ribs 9, 10, 11, 12 exhibit a height parallel to the longitudinal extension of blades 2, 3, 4 and a width parallel to the circumferential direction of blade rim segment 1, which are roughly equal. True, the height of reinforcement ribs 9, 10, 11, 12 is smaller than the height of reinforcement ribs 13 around the openings 14, 15, 16, 17. Also, the length of reinforcement ribs 9, 10, 11, 12 is varied in the axial direction. For example, reinforcement ribs 9, 12 run along a larger part of front wall 8, and thus are of a greater length than reinforcement ribs 10, 11. Here it is unimportant whether we are dealing with reinforcement ribs that are around openings 14, 15, 16, 17 in connection with reinforcement ribs 13 or with a reinforcement rib like reinforcement rib 11 between two openings 16 and 17.

Thus, the invention-specific blade rim segment 1 represents a one-piece blade rim segment, which exhibits hollow blades 2, 3, 4 and which is directionally solidified. The blade rim segment 1 show thus makes it possible not only to form one such blade rim segment, but also offers trimmed properties, since in the area of shroud band 6, through the arrangement of reinforcement ribs 9, 10, 11, 12, peaks in stresses can be avoided during loading.

Figure 2:
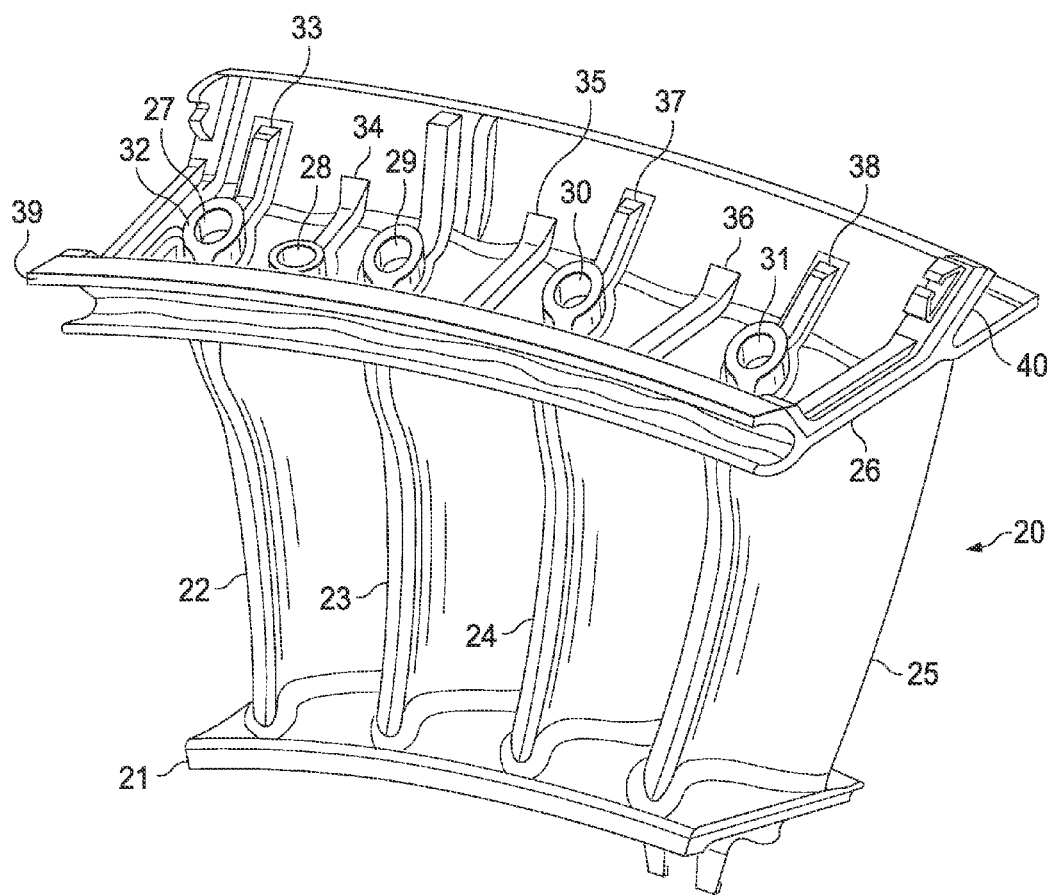
FIG. 2: a perspective depiction of a second embodiment form of an invention-specific blade rim segment.

FIG. 2 shows an additional embodiment form of the invention-specific blade rim segment 20, in which, instead of three blades as in embodiment example 1, four blades are situated in a blade rim segment 20 together with two shroud bands 21 and 26. Similar to the embodiment FIG. 1, the shroud band has a U-like shape with front walls 39 and 40, which form the legs of the U. In the area of shroud band 26, again openings 27, 28, 29, 30, 31 are provided, which serve as core removal sites for the cavities of blades 22, 23, 24, 25. With the embodiment form of FIG. 2, around openings 27, 28, 29, 30, 31, reinforcement ribs 32 are provided, and again only reinforcement rib 32 around opening 27 is provided with a reference number. Additionally, again reinforcement ribs 33, 34, 35, 36, 37, 38 are situated, which run axially from the front wall 39 to the front wall 40 and from one of the reinforcement ribs 32 surrounding the openings 27, 28, 29, 30, 31 to the front walls 39 and 40. Here also, the height, length and width of the reinforcement ribs can be different. The advantage connected with blade rim segment 20 of the embodiment form of FIG. 2 is that fewer blade rim segments 20 must be used to form an entire blade rim, and thus the assembly expense is lower. In addition, owing to the smaller number of blade rim segments, less expense is necessary in processing. Added to this, the number of attaching parts is reduced, as is the possibility of leakage losses.

Although the present invention has been described in detail using the embodiment examples, for one skilled in the art it is self-evident that the invention is not limited to these embodiment examples, but rather variations are possible to the extent that individual features can be omitted, or features can be combined in other ways, without departing from the proprietary right of the appended claims.

What is claimed is:

1. A blade rim segment for a turbomachine having a rotational axis defining an axial direction, the blade rim segment comprising:
   at least one shroud band extending along a segment of a circle;
   at least three blades connected to the shroud band in single-piece fashion, each respective blade extending radially from the shroud band from a respective connection area;
      wherein each respective blade is configured to be hollow with at least one respective channel formed therethrough; and
      wherein each respective channel has a respective outlet opening formed in the shroud band in the respective connection area of the respective blade;
   a respective first reinforcement rib formed on the shroud band at the respective outlet opening of the respective channel of each respective blade, each respective first reinforcement rib having a surrounding portion surrounding the respective outlet opening, the surrounding portion having a first height parallel to the longitudinal extension of the blades above the shroud band, and an axial portion running axially, the axial portion having a second height above the shroud band and having a width parallel to the circumferential direction;
      wherein the first height of the surrounding portion is greater than the second height of the axial portion; and at least one second reinforcement rib formed on the shroud band between two of the first reinforcement ribs and running parallel to the axial portions of the first reinforcement ribs;

wherein the at least one second reinforcement rib is independent from any of the respective outlet openings; and wherein the at least one second reinforcement rib is situated outside the respective connection areas of the shroud band and the respective blades; and wherein the blade rim segment is formed of a single piece directionally solidified cast material having a lattice of crystallites set in a predetermined orientation.

2. A blade rim segment according to claim 1, wherein the blades are guide blades or turbine blades.

3. A blade rim segment according to claim 1, wherein two shroud bands are provided including an upper shroud band disposed at an upper end of the blades and a lower shroud band disposed at a lower end of the blades.

4. A blade rim segment according to claim 1, wherein the number of blades in the blade rim segment ranges from four blades to six blades.

5. A blade rim segment according to claim 1, wherein:

the shroud band includes a pair of spaced-apart front walls configured such that, when the shroud band is viewed in cross section cut in the axial direction, the shroud band exhibits a U-like shape with each of the spaced-apart front walls forming a respective leg of the U-like shape;

the axial portions running axially of the first reinforcement ribs and second reinforcement ribs are axially disposed between the front walls forming the legs of the U-like shape; and the first and second reinforcement ribs do not project in the radial direction over the legs of the U-like shape.

6. A blade rim segment according to claim 5, wherein no portion of the axially running first and second reinforcement ribs runs along either of the front walls of the shroud band.

7. A blade rim segment according to claim 5, wherein a portion of at least one of the axial portions running axially of the first reinforcement ribs or a portion of the axially running second reinforcement ribs runs along one or both of the front walls of the shroud band; and wherein the portion of the reinforcement rib running along the front wall of the shroud band maintains the height of the axial running portion substantially equal to the width of the axial running portion.

8. A blade rim segment according to claim 5, wherein the first and second reinforcement ribs exhibit differing widths, heights, or lengths.

9. A blade rim segment according to claim 1, wherein the second reinforcement rib(s) are disposed in location(s) offset to the locations of connection between the blades and the shroud band.

10. A method for manufacturing a blade rim segment for a turbomachine having a rotational axis defining an axial direction, the method comprising the following steps:

providing a casting form configured to include
a cavity for a least one shroud band that extends along the segment of a circle,
cavities for at least three blades that are connected to the cavity for the shroud band and extend radially from the cavity for the shroud band,
at least one removable core element disposed within the cavity for each blade to create at least one hollow channel through the blade and a core removal outlet opening on the shroud band;

further configuring the casting form to include, at each respective core removal outlet opening, a cavity for a first reinforcement rib having a surrounding portion surrounding the outlet opening, the surrounding portion having a first height parallel to the longitudinal extension of the blades above the shroud band, and an axial portion running axially on the shroud band, the axial portion having a second height above the shroud band and having a width parallel to the circumferential direction;

wherein the first height of the surrounding portion is greater than the second height of the axial portion; and further configuring the casting form to include, at least between two of the cavities for the first reinforcement ribs, a cavity for at least one second reinforcement rib on the shroud band independent from any of the core removal outlet openings;

filling the cavities in the casting form with a melted material that is suitable for a directional solidification; and directionally solidifying the material in the casting form.

11. A method according to claim 10, further comprising the step of:

inserting a seed crystal into the casting form before filling the casting form with the melted material.

12. A method according to claim 11, further comprising the step of:

cooling the melted material, after filling the cavities in the casting form, such that the material solidifies in one piece having a lattice of crystallites set in a predetermined orientation.

* * * * *